United States Patent [19]

Morgavi

[11] Patent Number: 5,558,449
[45] Date of Patent: Sep. 24, 1996

[54] SIMULTANEOUS TWO-FACE PRINTING MACHINE

[75] Inventor: Paul Morgavi, La Ciotat, France

[73] Assignee: Gemplus Card International, Gemenos, France

[21] Appl. No.: 419,453

[22] Filed: Apr. 10, 1995

[30] Foreign Application Priority Data

Apr. 15, 1994 [FR] France ................... 94 04829

[51] Int. Cl.⁶ .................................. B41J 2/315
[52] U.S. Cl. ............ 400/188; 400/149; 400/120.16; 347/197
[58] Field of Search ................. 400/188, 149, 400/120.16, 120.17, 120.01; 347/171, 197, 198, 222

[56] References Cited

U.S. PATENT DOCUMENTS 5,452,959   9/1995   Oka ........................................ 400/188

FOREIGN PATENT DOCUMENTS

| | | |
|---|---|---|
| 0147730 | 7/1985 | European Pat. Off. . |
| 2631888 | 12/1989 | France . |
| 4034327 | 4/1992 | Germany . |
| 57-69071 | 4/1982 | Japan . |
| 3-205168 | 9/1991 | Japan . |
| WO-A-8803873 | 6/1988 | WIPO . |
| WO-A-8804132 | 6/1988 | WIPO . |

OTHER PUBLICATIONS

Patent Abstracts of Japan, vol. 11, No. 34, JP 61–202863, Jan. 1987.

Primary Examiner—John S. Hilten
Attorney, Agent, or Firm—Nilles & Nilles, S.C.

[57] ABSTRACT

The machine is a card printer that carries out simultaneous black-and-white or color printing on both faces of a card. This machine uses two identical printers of the type using thermal printing heads and ribbons placed on either side of a device to guide and convey the card to be printed on. A device for the simultaneous positioning of the thermal printing heads enables each ink-bearing ribbon to be applied against one of the faces of the card when it comes under the heads. The invention can be applied to bank cards, entry cards, telephone cards.

18 Claims, 3 Drawing Sheets

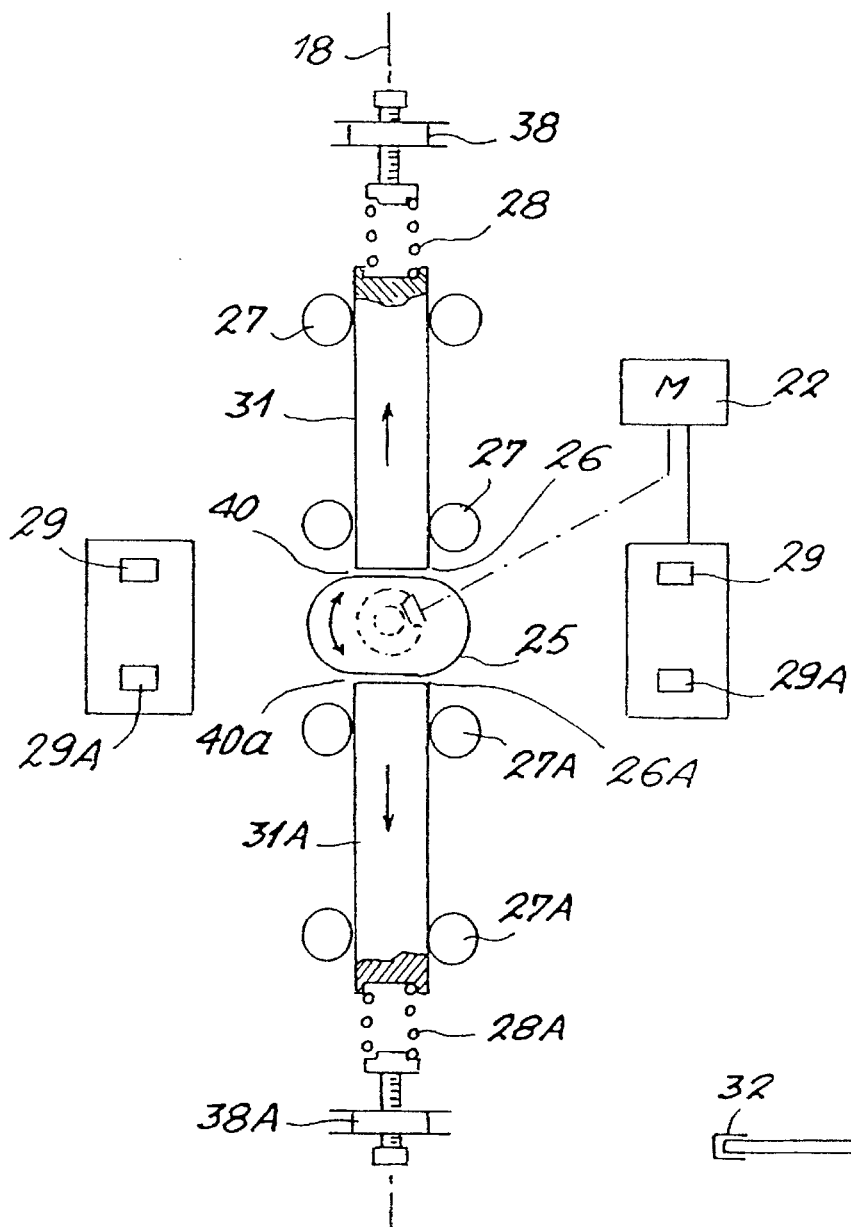
FIG. 2
FIG. 3
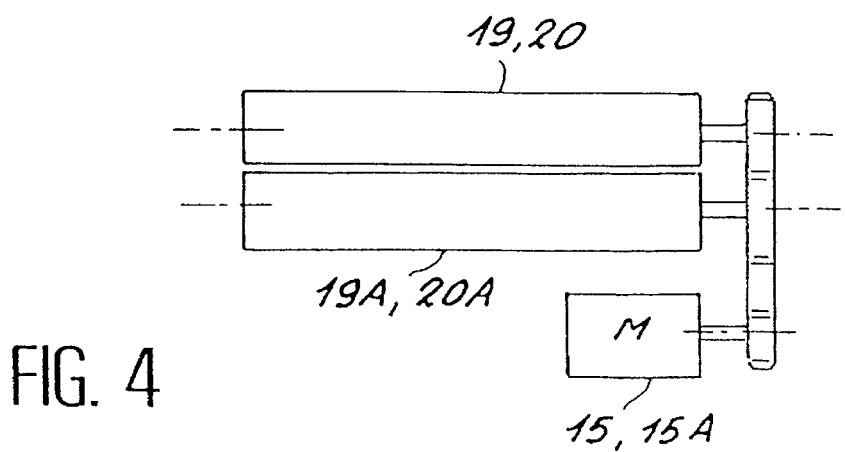
FIG. 4

SIMULTANEOUS TWO-FACE PRINTING MACHINE

BACKGROUND OF THE INVENTION

1. Field of the Invention

The present invention relates to a simultaneous two-face color printing machine for the printing of cards, particularly cards of plastic.

2. Description of the Prior Art

In the known technology of thermal transfer, the ink is deposited and fixed to the printing medium by means of resistors that form a thermal printing head heating a ribbon coated with inks by means of a modulated electrical current.

There is also the known plastic ribbon technology wherein the primary colors, yellow, magenta and cyan, are deposited sequentially, making it possible, by combinations of different wavelengths called subtractive combinations, to obtain a range of several millions of colors.

The French patent application No. 94 02116 entitled COLOR PRINTING MACHINE, filed on 24 Feb. 1994 by the present applicant, describes a color printing machine wherein the card to be printed on is moved several times successively beneath the same thermal printing head under which the sequentially colored ribbon runs past. In such a machine, after the first color has been printed, the thermal printing head is raised to enable the return of the card to its starting point. The card is then moved again beneath the thermal printing head in the low position for the printing of the second color. The cycle starts again for the printing of the third and final color.

The French patent application no 94 04827 entitled "SYSTEM FOR THE AUTOMATIC TWO-FACE BLACK-AND-WHITE AND COLOR PRINTING OF CARDS BY THE TURNING OVER OF THE CARD" filed by the Applicant on the 15 Apr. 1994, discloses a color printing machine in which the card to be printed is moved by the card-face side several times successively beneath the same thermal printing head under which the sequential color ribbon runs. In such a machine, after the first color has been printed, the thermal printing head is raised to enable the return of the card to its starting point. The card is then moved again beneath the thermal printing head in the low position for the printing of the second color. This cycle starts again for the printing of the third and last color.

The card is then turned over in a turning-over device and presented on the card-back side beneath a thermal printing head, which may be the same as the head used for the card-face side, where it is moved back and forth successively three times as stated here above for the printing of the three primary colors.

However, this system is not entirely satisfactory when large quantities of cards must be printed. Indeed, while a card is going through its printing cycle (namely entry, rotation by ±180°, exit), a non-negligible period of time elapses during which the printing capacities of the printing head are unused.

SUMMARY OF THE INVENTION

To overcome this drawback, the object of the invention is to make a printer that enables simultaneous printing of both faces of the card and hence provides for greater speed of execution.

The invention concerns a simultaneous two-face printing machine for cards, such as plastic cards, comprising:

a device for guiding and conveying a card;

two identical printing machines each comprising a thermal printer head, a ribbon carrying inks and substances to be deposited on said card to be printed on wherein:

the device for guiding and conveying a card is formed by guides, rollers driven by motors that are controlled by detection means, the two identical printing machines, each comprising a thermal printing head and a ribbon carrying inks and substances to be deposited on said card to be printed on, are provided with a device for controlling the running past of said ribbon, each printing machine being placed on either side of the guiding and conveying device so that their thermal printing heads can move along one and the same printing axis perpendicular to the card to be printed on, and wherein the printing machine furthermore comprises a device for simultaneous moving and positioning of the thermal printing heads; and an electronic control circuit for the guiding and conveying device of the printing machines and for the device for the simultaneous moving and positioning of the thermal printer heads so as to bring the ribbons and the thermal printer heads into contact with the card to be printed on during the passage of this card in the guiding and conveying device at the position of the thermal printing heads.

The device for the moving and positioning of the thermal printer heads comprises a cam driven by a driving means that brings about the symmetrical and reverse shifting of two shoulders that are respectively fixedly joined to each thermal printer head and move along the same vertical axis, being guided by roller wheels and provided with an adjustable spring enabling each head, after the detection of a specified clearance between the cam and each shoulder by an optical detection device, to exert an equal and opposite pressure on each face of the card to be printed on.

BRIEF DESCRIPTION OF THE DRAWINGS

Other features and advantages of the invention shall appear from the following detailed description, made with reference to the appended drawings, of which:

FIG. 2 is a schematic diagram of the system for the positioning of the thermal printer head, FIG. 3 is a sectional view showing the card to be printed on in the guiding and conveying device, FIG. 4 is a view showing a pair of driving rollers for the card to be printed on, and FIG. 5 is a block diagram of an electronic control system for the machine according to the invention.

MORE DETAILED DESCRIPTION

Figure 1:
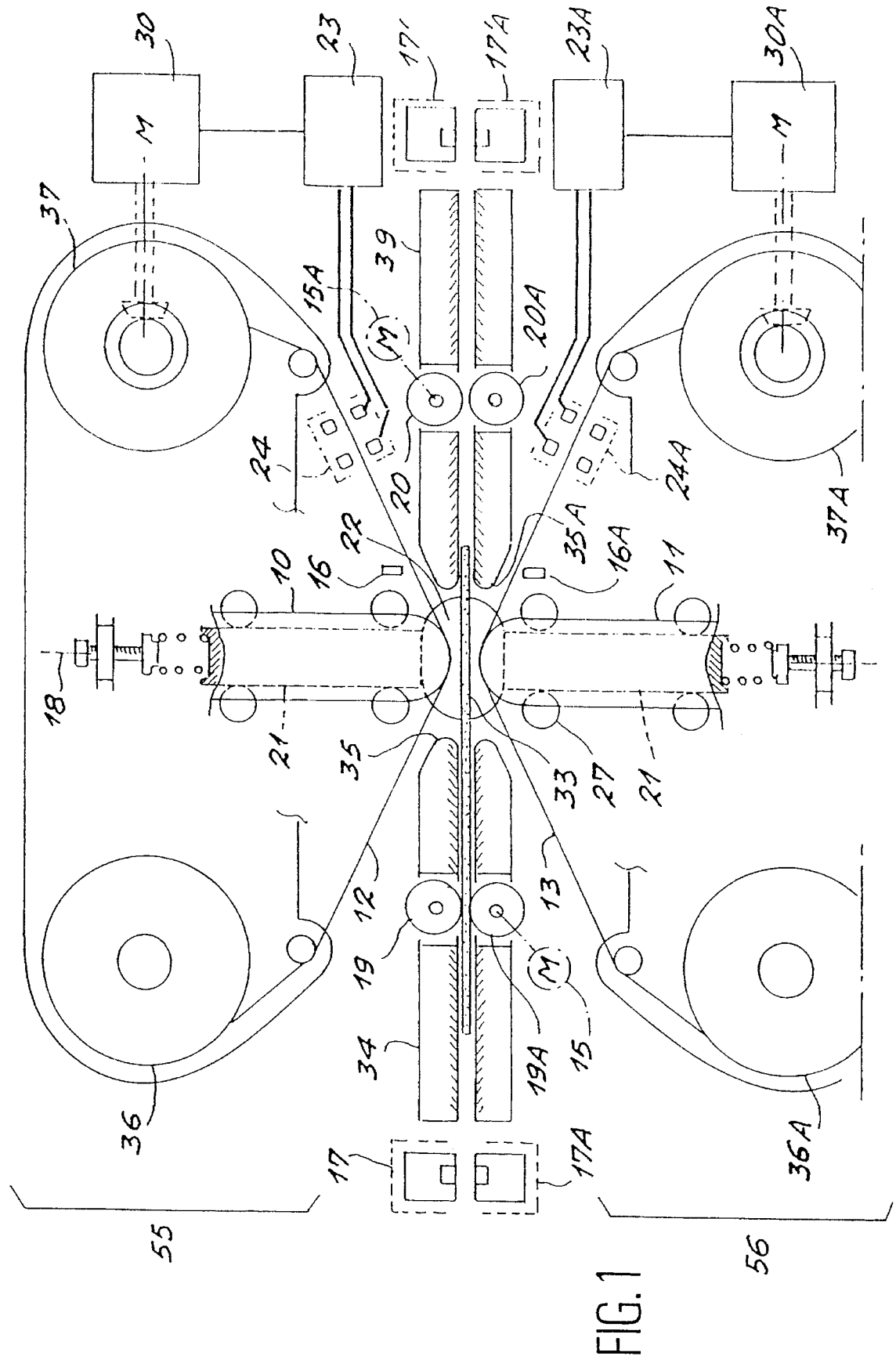
FIG. 1 is a schematic view of the machine according to the invention.

The machine according to the invention has an axis of symmetry in a horizontal plane determining means for printing on the card-face of a card 33 and means for simultaneous printing on the card-back of this card. It has two thermal printer heads working on one and the same vertical axis 18: one is the bottom head 10 and the other is the top head 11. These heads may move vertically from the bottom to the top and from the top to the bottom along a guiding rail 31, 31A held by rollers 27, 27A.

A ribbon 12 is associated with the thermal printer head 10. This ribbon 12 bears inks in a sequential order. The ribbon gets unrolled from a feed reel 36, moves beneath the thermal printer head 10 and gets wound on a take-up reel 37 driven by a stepping motor 30 which is monitored by a controlling system 23 so as to synchronize the variable winding angular speed with a constant running speed.

A ribbon 13 is associated with the thermal printer head 11. This ribbon 13 bears inks in a sequential order. It gets unwound from a feed reel 36A, passes on the thermal printer head 11 and gets wound on a take-up reel 37A which is driven by a stepping motor 30A controlled by a controlling system 23A so as to synchronize the variable winding angular speed with a constant running speed.

The card 33 to be printed on is guided and conveyed between the thermal heads 10 and 11 and the associated ribbons 12 and 13 by a guiding and conveying device placed within two fixed half-casings 34, 34A. This device has flat U-shaped sliders 32 enabling the card 33 to slide horizontally by means of at least two pairs of rollers 19, 19A, 20, 20A that are symmetrical, rotate in reverse directions and are driven by a motor 15, 15A. The pairs of card driving rollers are at a distance from each other by a length which is smaller than the length of a card so that a card entering the guiding and conveying device is always conveyed (pushed or pulled) by at least one pair of rollers 19, 19A, 20, 20A. The two half-casings 34, 39 are provided with bevelled lips 35, 35A facing each other and at a distance from each other equal to a length sufficient to enable the passage of the two thermal printing heads 10, 11 that come into contact with the two faces of the card 33 to be printed on, but enable the out-of-casing journey of a card to be reduced to the minimum.

The card 33 undergoes a surface heating owing to the technology of printing by thermal transfer. This heating may release strains and give rise to a slight curvature of the card owing to the differences in temperature between the two faces, for one face which is printed with dark colors undergoes a higher increase in temperature than the other face which is printed with light colors. The lips 35, 35A are used to receive the card and direct it towards the rectilinear sliders 32 before the strain gives rise to dimensional disorders. The lips are positioned so that the card 33, which is pushed by the rollers, is not out of the casings except vertically to the thermal printing heads and can be easily taken back into a guided system provided that the space requirement of the heads allows it.

The guiding and conveying device comprises four devices 17, 17A and 17', 17'A for the detection of the card 33 to be printed on, placed as follows: the pair 17, 17A at the entry and the other pair 17', 17'A at the exit. A third pair of detection devices 16, 16A is placed after the thermal printing heads and in their vicinity. These detection devices are preferably of the photoelectric cell type. The thermal printing heads 10 and 11 are positioned with respect to the card 33 to be printed on by a simultaneous positioning system that comprises a cam 25 driven by a motor 22 that moves two shoulders 26, 26A symmetrically and in reverse directions. These shoulders are fixedly joined to each thermal printing head 10, 11. The shifting is done on the same vertical axis 18, along a rail 31, 31A guided by rollers 27, 27A. The cam 25 conveys the thermal printing heads 10, 11 to bring them into contact with the two faces of the card 33. It continues to rotate until a specified clearance 40, 40A is detected between the cam and the shoulders by a detection device 29, 29A activating the stopping of the motor 22. When the cam 25 no longer drives the shoulders 26, 26A, with the heads being in contact with the two cases of the card, springs 28, 28A adjustable by a knob 38, 38A enable each thermal printing head to exert an equal and opposite pressure on the two faces of the card to be printed on. The card is therefore not subjected to strain by an imbalance of pressure on its faces. If such an imbalance should occur, notably owing to the breaking or bad adjustment of a calibrated spring, the positioning system is capable of detecting it.

Indeed, the normal operation results in the simultaneous appearance of two clearances between the cam and each of the shoulders as well as by a contrary development of the two clearances until the motor of the cam comes to a stop.

A bad adjustment of a spring will prompt a lag between the appearance of one clearance and the other as well as different increases in value. These are all so many elements detected by the detection device 29 or 29A depending on the site of the disorder.

Figure 5:
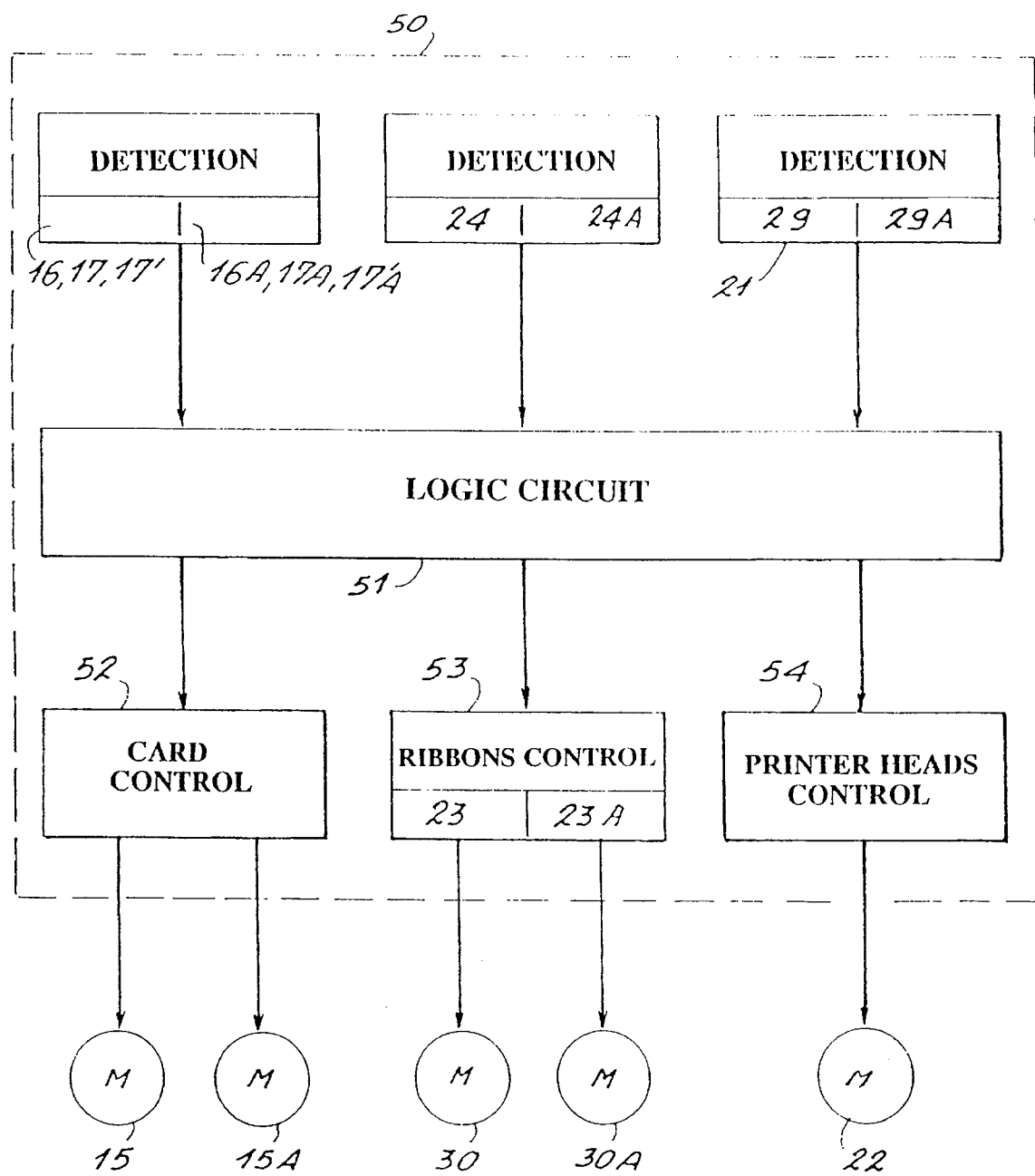

The set of elements of the machine as described with reference to FIGS. 1 to 4 is controlled by an electronic control system 50 the block diagram of which is given by FIG. 5:

- the detection devices 16, 16A, 17, 17A, 17', 17'A of the device for guiding and conveying the card 33;
- the devices 24 and 24A for detecting the indicators and separators on the ribbons 12, 13;
- the devices 29, 29A for detecting the positions of the thermal printing head;
- a microprocessor type logic circuit 51 that receives the detection signals given by the detection devices 16, 16A, 17, 17A, 17', 17'A, 24, 24A, 29, 29A and outputs signals applied to devices for the controlling of the motors 15, 15A, 30, 30A and 22;
- a controlling device 52 for the motors 15 and 15A for making the card 33 move past beneath the thermal printer heads 10 and 11;
- a controlling device 54 for the thermal printer head drive motor 22 in order to convey each head and bring it into contact with the associated supporting ribbon and the card to be printed and release the head when the card is in movement without being printed on;
- a device 53 for controlling the drive motors 30 and 30A of the take-up reels 37 and 37A so as, firstly, to successively position each ink or substance as a function of the translational motions of the card to be printed on beneath the thermal printer heads and, secondly, to keep a constant running speed of the ribbon beneath the thermal printer head despite the increase in the diameter of the drum of the take-up reel at each turn.

It must be noted that the controlling device 53 for the motors 30 and 30A actually comprises both devices 23 and 23A of FIG. 1 which work independently except if certain anomalies are detected, in which case the printing cycle is stopped.

Thus, each control device 23 and 23A identifies and gets locked into an indicator for the start of the primary color sequence of its ribbon and separately permits the progress of the thermal transfer printing cycle. However, the two authorisations must obligatorily be delivered so that the cycle starts.

If, for example, one ribbon is used up before the other one, the printing cycle is interrupted and can no longer be resumed except after the reloading of a new ribbon and the resetting of the indicators. Similarly, if a hitch is detected in the reading of an indicator of a ribbon, the cycle is stopped. Such a controlling device has been described in the patent application No. 94 02118 filed by the Applicant on 24 Feb. 1994 and entitled: SYSTEM AND METHOD TO CONTROL THE WINDING OF A RIBBON ON A TAKE-UP REEL.

The above description of the simultaneous two-face printing machine shows that it actually comprises two identical printing machines 55 and 56 mounted face to face on either side of a horizontal guiding and conveying device, the thermal printing heads of which are moved in synchronism by an appropriate mechanism. Furthermore, the devices for controlling the winding of each ribbon are synchronized by means of the logic circuit 51 (FIG. 5).

The machine works as follows. When the card 33 is presented horizontally in the longitudinal direction at the entry of the guiding and conveying device, it is taken over by a pair of drive rollers 19, 19A and slides within the left-hand half-casings 34 in being guided by the sliders 32 towards the thermal printing heads 10, 11. The card begins to come out by the bevelled lips 35 of the left-hand half-casings 34 and comes up vertically to the thermal printing heads.

The heads are then driven by a vertical motion, from top to bottom for the upper head 10 and from bottom to top for the lower head 11, by means of the cam-based positioning system 25 and the motor 22. At the same time, the ribbons 12, 13 have got positioned against the card and the thermal printing heads in such a way that the first ink of the sequence comes beneath the two faces to be printed on. The supporting springs 28, 28A exert an equal and opposite pressure on each face of the card.

The card which is pushed by the drive rollers of the left-hand half-casing 34 is driven beneath the thermal printing heads at a constant speed. Each ribbon, driven by its distinct motor 30, 30A, runs at a constant speed beneath the thermal printing head 10, 11 with which it is in contact and gets wound on the take-up reel 37, 37A driven by a stepping motor 30, 30A. The number of steps is synchronized with the running speed of the ribbon beneath the thermal printing head to take account of the increase of the diameter of the take-up reel at each turn.

The card enters the right-hand half-casing 39 by its bevelled part 35A where it is taken over by the drive rollers 20, 20A which pull it, guided by the sliders 32, at constant speed beneath the thermal printer heads until the printing of the first ink by thermal transfer is entirely done on all the surfaces of the card on both sides.

After this first transfer of inks, the printing heads are driven by a vertical motion from bottom to top by the upper head 10 and from top to bottom by the lower head 12 by means of the cam-based positioning system 25 and motor 22. The card is driven in the reverse direction and is conveyed in the half-casings by the drive rollers the direction of rotation of which is reversed. It goes beneath the thermal printing heads which are in the raised position and gets reset precisely on its initial starting base.

A new printing cycle, which is strictly identical to the one that has just been described here above, takes place to carry out the thermal transfer of the second ink on both sides. A third cycle takes place for the third ink and as the case may be a fourth cycle for the deposit, if necessary, of a protective film.

The two-face printing being completed, the card is taken out of the machine by known systems (not shown in the drawings). A new card is presented into the left-hand half-casing in order to continue the inking process of the next card.

What is claimed is:

1. A printing machine for simultaneously printing on two faces of a card, the printing machine comprising:

a guide, the guide defining a pathway along which the card is conveyed through the printing machine;

a plurality of rollers disposed along the pathway along which the card is conveyed through the printing machine;

a first card-drive motor, the first card-drive motor being coupled to a first one of the plurality of rollers, the first card-drive motor cooperating with the plurality of rollers so as to convey the card along the pathway;

a first printing machine, the first printing machine being disposed on a first side of the guide, the first printing machine further comprising
        a first thermal print head, the first print head being movable along an axis which is perpendicular to the two faces of the card,
        a first ribbon carrying inks and substances to be deposited on the card by the first thermal print head;

a second printing machine, the second printing machine being identical to the first printing machine, the second printing machine being disposed on a second side of the guide, and the second printing machine further comprising
        a second thermal print head, the second print head being movable along the axis which is perpendicular to the two faces of the card, the axis thereby forming a common axis of movement of the first and second print heads, and the second print head cooperating with the first print head so as to simultaneously print on the two faces of the card, and
        a second ribbon carrying inks and substances to be deposited on the card by the second thermal print head;

a print head motor, the print head motor being coupled to the first and second print heads and being adapted for moving the first and second print heads along the common axis; and an electronic control circuit, the electronic control circuit being coupled to the first card-drive motor and to the print head motor, the electronic control circuit causing the first card-drive motor and the print head motor to cooperate so as to bring the first and second thermal print heads into contact with the card during the passage of the card in the guide when the card is at the position of the first and second thermal print heads.

2. A printing machine according to claim 1, further comprising:

a cam driven by the printing machine motor, first and second shoulders, the first shoulder being fixedly joined to the first thermal print head, the second shoulder being fixedly joined to the second thermal print head, and the first and second shoulders moving along the common axis, roller wheels, the roller wheels guiding the movement of the first and second shoulders, and first and second adjustable springs, the first adjustable spring being coupled to the first shoulder, the second adjustable spring being coupled to the second shoulder, the first and second adjustable springs acting respectively through the first and second print heads, after the detection of a specified clearance between the cam and each shoulder, to exert an equal and opposite pressure on each face of the card.

3. A printing machine according to claim 1, wherein the first one of the plurality of rollers is disposed prior to the first and second print heads; and wherein a second one of the plurality of rollers is disposed after the first and second print heads; and further comprising a second card-drive motor, the second card-drive motor being coupled to the second roller, the second card-drive motor also cooperating with the plurality of rollers so as to convey the card along the pathway; and means for detecting the position of the card, the detection means giving electrical signals to the electronic control circuit.

4. A printing machine according to claim 1, further comprising a supply reel, the supply reel having a portion of the first ribbon wound thereon and supplying the first ribbon to the first thermal print head;

a take-up reel, the take-up reel having a remaining portion of the first ribbon wound thereon;

a ribbon control circuit;

a stepping motor, the stepping motor being coupled to the take-up reel and driving the take-up wheel, and the stepping motor being coupled to the ribbon control circuit and receiving stepping feed signals from the ribbon control circuit which make the ribbon move past the first print head at a constant linear speed as the diameter of the ribbon on the take-up reel varies.

5. A method of printing on a card having two faces, the method comprising the steps of feeding the card into a guide of a printing machine;

conveying the card through the printing machine along a path defined by the guide;

moving a first print head along an axis toward the card;

moving a second print head along the axis toward the card and toward the first print head such that the second print head is disposed opposite the first print head on the other side of the card, the axis thereby forming a common axis of movement of the first and second print heads;

printing on a first one of the two faces of the card, the first face printing step being performed by the first print head; and printing on a second one of the two faces of the card, the second face printing step occurring simultaneously with the first face printing step, and the second face printing step being performed by the second print head.

6. A method according to claim 5, wherein the first print head moving step and the second print head moving step occur simultaneously.

7. A method according to claim 5, further comprising the steps of applying a first force to the card, the first force being applied by the first print head; and applying a second force to the card, the second force being applied by the second print head, and the second force being of equal magnitude as the first force but opposite in direction.

8. A method according to claim 5, wherein the first print head is fixedly joined to a first shoulder which is movable along the common axis, wherein the second print head is fixedly joined to a second shoulder which is movable along the common axis, and further comprising the steps of driving a cam with a motor, the cam simultaneously engaging the first and second shoulders;

causing a first clearance to appear between the cam and the first shoulder; and causing a second clearance to appear between the cam and the second shoulder, the second clearance causing step occurring simultaneously with the first clearance causing step, and the second clearance, being of the same size as the first clearance.

9. A method according to claim 5, wherein the first print head is fixedly joined to a first shoulder which is movable along the common axis, wherein the second print head is fixedly joined to a second shoulder which is movable along the common axis, and further comprising the steps of driving a cam with a motor, the cam simultaneously engaging the first and second shoulders; then causing a first clearance to appear between the cam and the first shoulder; and causing a second clearance to appear between the cam and the second shoulder, the second clearance causing step occurring simultaneously with the first clearance causing step, and the second clearance being of the same size as the first clearance; then detecting the first and second clearances; then stopping the driving of the cam in response to the detection of the first and second clearance during the detecting step; and then applying a first force to the card, the first force being applied by the first print head; and applying a second force to the card, the second force being applied by the second print head, and the second force being of equal magnitude as the first force but opposite in direction.

10. A method according to claim 5, wherein the first print head is a thermal print head supplied by a ribbon, and further comprising the steps of winding the ribbon on a take-up reel after the ribbon has passed beneath the first print head, the winding step including the step of driving the take-up reel with a stepping motor; and ensuring that the ribbon moves beneath the first print head at a constant linear speed, the ensuring step including the step of synchronizing the angular speed of the stepping motor with the increasing diameter of the take-up reel.

11. A method according to claim 5, further comprising the steps of detecting insertion of the card into the printing machine;

detecting movement of the card past the first and second printing heads; and detecting exit of the card from the printing machine.

12. A printing machine for simultaneously printing on two faces of a card, the printing machine comprising a guide, the guide defining a pathway along which the card is conveyed through the printing machine;

a first print head, the first print head being disposed on a first side of the guide, the first print head being movable along an axis which is perpendicular to the two faces of the card, the first print head being movable to a location that is immediately adjacent a first one of the two faces of the card; and a second print head, the second print head being disposed on a second side of the guide, the second print head being movable along the axis which is perpendicular to the two faces of the card, the axis thereby forming a common axis of movement of the first and second print heads, the second print head being movable to a location that is immediately adjacent a second one of the two faces of the card, and the second print head cooperating with the first print head so as to simultaneously print on the two faces of the card.

13. A printing machine according to claim 12, further comprising a first shoulder, the first shoulder being fixedly joined to the first printing head and being movable along the common axis;

a second shoulder, the second shoulder being fixedly joined to the second printing head and being movable along the common axis;

a motor;

a cam, the cam being disposed between the first and second shoulders, the cam being coupled to the motor and to the first and second shoulders so as to move the first and second print heads symmetrically in opposite directions;

a first spring, the first spring being coupled to the first shoulder and the first print head, the first spring applying a first force to the first one of the two faces of the card via the first shoulder and the first print head; and a second spring, the second spring being coupled to the second shoulder and the second print head, the second spring applying a second force to the second one of the two faces of the card via the second shoulder and the second print head, the second force being of equal magnitude as the first force but opposite in direction.

14. A printing machine according to claim 13, further comprising a first clearance detector, the first clearance detector being coupled to the motor and detecting the appearance of a first clearance between the cam and the first shoulder; and a second clearance detector, the second clearance detector being coupled to the motor and detecting the appearance of a second clearance between the cam and the second shoulder.

15. A printing machine according to claim 12, further comprising a guiding and conveying device, the guiding and conveying device being formed of the guide and further including a first motor;

first and second rollers, the first roller being coupled to the first motor, the first and second rollers being spaced from the first and second printing heads along the pathway on a first side of the common axis, and the first and second rollers exerting a force on the card thereby causing the card to move along the pathway;

a second motor; and third and fourth rollers, the third roller being coupled to the second motor, the third and fourth rollers being spaced from the first and second printing heads along the pathway on a second side of the common axis, the third and fourth rollers being separated from the first and second rollers by a distance which is less than the length of the card, and the third and fourth rollers exerting a force on the card thereby causing the card to move along the pathway.

16. A printing machine according to claim 15, further including a first sensor disposed prior to the first and second rollers along the path of movement of the card, the first sensor being coupled to the first motor;

a second sensor disposed after the third and fourth rollers along the path of movement of the card, the second sensor being coupled to the second motor; and a third sensor disposed adjacent the first and second print heads along the path of movement of the card.

17. A printing machine according to claim 12, wherein the first and second print heads are thermal print heads, and further comprising first and second ribbons;

first and second supply reels, the first and second supply reels supplying the first and second ribbons respectively to the first and second print heads;

first and second take-up reels, the first and second take-up reels winding the first and second ribbons respectively after being supplied to the first and second print heads;

first and second stepping motors, the first and second stepping motors being respectively coupled to the first and second take-up reels;

first and second ribbon position sensors, the first and second ribbon position sensors being disposed in respective paths of travel of the first and second ribbons and sensing movement of the first and second ribbons, respectively;

first and second ribbon motor controllers, the first ribbon motor controller circuit being coupled to the first ribbon stepping motor and the first ribbon position sensor, the first ribbon motor controller providing stepping feed signals to the first stepping motor which synchronize the angular speed of the first stepping motor with the increasing diameter of the first take-up reel so as to make the first ribbon move past the first print head at a constant linear speed, the second ribbon motor controller circuit being coupled to the second ribbon stepping motor and the second ribbon position sensor, and the second ribbon motor controller providing stepping feed signals to the second stepping motor which synchronize the angular speed of the second stepping motor with the increasing diameter of the second take-up reel so as to make the second ribbon move past the second print head at a constant linear speed.

18. A printing machine according to claim 17, further comprising a card conveying device, the card conveying device further including a plurality of rollers disposed along the path of the card, a plurality of sensors located along the path of the card, the plurality of sensors detecting the presence of the card at sensor locations, a card-drive motor coupled to one of the plurality of rollers, the card-drive motor cooperating with the plurality of rollers so as to move the card along the path, a card-drive motor controller, the card drive motor controller being coupled to the card-drive motor;

a print head positioning device, the print head positioning device further including first and second sensors located along the respective paths of the first and second print heads, a print head motor, the print head motor being coupled to the first and second print heads and being adapted for moving the first and second print heads along the common axis, a print head motor controller, the print head motor controller being coupled to the print head motor; and an electronic control circuit, the electronic control circuit being coupled to the plurality of sensors located along the path of the card, to the card-drive motor controller, to the first and second sensors located along the paths of the first and second print heads, to the print head motor controller, to the first and second ribbon position sensors, and to the first and second ribbon motor controllers so as to bring the first and second print heads supplied by the first and second ribbons into contact with the card during the passage of the card in the guide when the card is at the position of the first and second thermal print heads.

* * * * *